(12) United States Patent
Peterson

(10) Patent No.: US 8,127,447 B2
(45) Date of Patent: Mar. 6, 2012

(54) METHOD FOR DOWNHOLE SCREEN MANUFACTURING

(75) Inventor: Elmer R. Peterson, Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 609 days.

(21) Appl. No.: 12/274,136

(22) Filed: Nov. 19, 2008

(65) Prior Publication Data

US 2010/0122447 A1    May 20, 2010

(51) Int. Cl.
*B21D 39/00* (2006.01)
*E03B 3/18* (2006.01)

(52) U.S. Cl. ........... 29/896.62; 29/505; 29/508; 29/515; 29/516; 29/517; 166/227

(58) Field of Classification Search ............. 29/896.6, 29/896.62, 505, 508, 509, 515, 516, 517, 29/525.01; 403/273, 277, 285; 72/62, 370.06, 72/370.25; 166/227, 228, 230, 231, 233; 210/459

See application file for complete search history.

(56) References Cited

U.S. PATENT DOCUMENTS

| | | | |
|---|---|---|---|
| 5,611,399 A * | 3/1997 | Richard et al. | 166/230 |
| 6,109,349 A * | 8/2000 | Simone et al. | 166/230 |
| 6,305,468 B1 | 10/2001 | Broome et al. | |
| 6,415,409 B1 * | 7/2002 | Rhodes et al. | 714/738 |
| 6,607,032 B2 | 8/2003 | Voll et al. | |
| 2002/0178582 A1 * | 12/2002 | Echols et al. | 29/896.61 |
| 2004/0026313 A1 * | 2/2004 | Arlon Fischer | 210/484 |

OTHER PUBLICATIONS

Yuan, Y, et al., "In-Situ Mechanical and Functional Behavior of Shape Memory Polymer for Sand Management Applications", SPE 143204, Jun. 2011, 1-10.
Coronado, Martin P., et al., "Next-Generation Sand Screen Enables Drill-In Sandface Completions", SPE 113539, Jun. 2008, 1-13.
Crow, S.L., et al., "Means for Passive Inflow Control Upon Gas Breakthrough", SPE 102208, Sep. 2006, 1-6.

* cited by examiner

*Primary Examiner* — Jermie Cozart
(74) *Attorney, Agent, or Firm* — Steve Rosenblatt

(57) ABSTRACT

A method of making a screen for downhole use uses mesh screen layers that are diffusion bonded to each other. The ends that will overlap to make a seam when the sheets that are attached together are rolled into a tube are compressed before the tube shape is created or thereafter when the tube shape and an inner base pipe are drawn through a die to join the seam made by the overlapping edges. Because of the compression of the edges, when they overlap to form a tube the wall thickness at the overlap is about the same as the remaining thickness of the screen portion. Optionally, a resilient material can be compressed into the open areas of the screen portions that will be overlapped to make the generally longitudinally oriented seam. The seam can be parallel to the screen axis or spiral around it. The outer perforated shroud provides a compressive force that maintains a barrier resistant to flow of sand particles between the seam overlapping surfaces as the outer perforated shroud, filtration tube and inner base pipe assembly is drawn through a die.

21 Claims, 2 Drawing Sheets

METHOD FOR DOWNHOLE SCREEN MANUFACTURING

FIELD OF THE INVENTION

The invention field is downhole screen manufacturing methods and more specifically methods of screen material fabrication and attachment of the screen material to the base pipe.

BACKGROUND OF THE INVENTION

Screens for downhole use typically are formed around a base pipe that is perforated or has some sort of openings. The base pipe is attached as part of a string extending downhole so that it can be properly positioned in a producing zone. Around the base pipe is a filter material and around the filter material is an outer shroud. The outer shroud is usually a thin metallic tube with punched openings that is designed to protect the screen material from damage when run in or when pulled out of the hole. The louvers are usually sufficiently large so as to not meaningfully restrict flow to the filter material. The target size particle for exclusion is determined by the opening size in the screen material.

In the past the screen material that has seen wide spread use is a Dutch Twill weave as shown and described in U.S. Pat. No. 5,611,399. This patent also shows a technique of running a tubular assembly through a die to close an overlapping longitudinal seam made of ends that are bent and doubled over on the tube shape. Other patents that relate to manufacturing screens for downhole use are U.S. Pat. Nos. 6,305,468 and 6,607,032.

The past techniques had a disadvantage of distinct out of round shape due to the doubling over of ends and folding them over. As a result during the process of joining to the base pipe, the applied compressive force to try to secure the ends of the assembly to the base pipe or to seal a longitudinal or spiral seam were not optimal. This was because the out of round shape limited the ability to uniformly apply a sealing compressive force all around the screen structure without overstressing the built up area of the folded and doubled over material of the filtration media. Another issue was the use of the Dutch Twill weave design from the point of view of cost and bulk when trying to form a seam.

The present invention relates to the use of layers of flat weave mesh material and diffusion bonding the layers to make a cohesive filter layer assembly that gets the performance of Dutch Twill weave at a fraction of the cost. Additionally, the assembly mating edges are compressed to reduce their thickness so that when rolled into a tube shape the ends will overlap and the thickness at the overlapping seam will be approximately the thickness of the assembly elsewhere thus minimizing the out or roundness of the shape and allowing a stronger joint to extend the length of the assembly as well as stronger end connections. Optionally, a resilient material can be placed on the overlapping edges and compressed into the weave either initially, when the assembly is still in flat sheet form, or thereafter when the assembly is in tube form and moved through a die with the base pipe. Those skilled in the art will more readily appreciate the details of the preferred mode of the invention from the description below and the associated drawings while recognizing that the full scope of the invention is to be found in the claims.

SUMMARY OF THE INVENTION

A method of making a screen for downhole use uses mesh screen layers that are diffusion bonded to each other. The ends that will overlap to make a seam when the sheets that are attached together are rolled into a tube are compressed before the tube shape is created or thereafter when the tube shape and an inner base pipe are drawn through a die to join the seam made by the overlapping edges. Because of the compression of the edges, when they overlap to form a tube the wall thickness at the overlap is about the same as the remaining thickness of the screen portion. Optionally, a resilient material can be compressed into the open areas of the screen portions that will be overlapped to make the generally longitudinally oriented seam. The seam can be parallel to the screen axis or spiral around it. The outer perforated shroud provides a compressive force that maintains a barrier resistant to flow of sand particles between the seam overlapping surfaces as the outer perforated shroud, filtration tube and inner base pipe assembly is drawn through a die.

DETAILED DESCRIPTION OF THE PREFERRED EMBODIMENT

Figure 1:
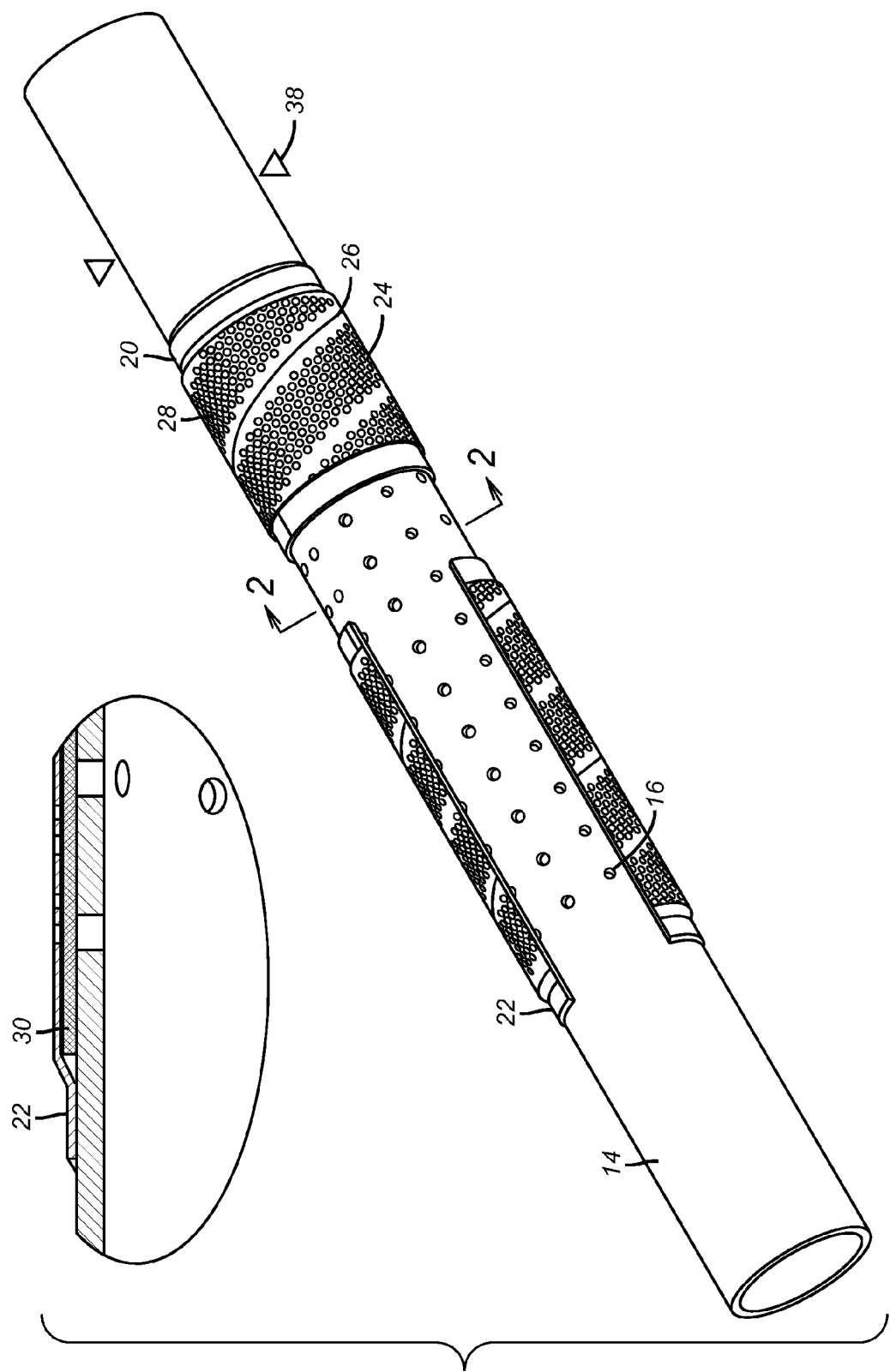
FIG. 1 is a perspective view part cut away to show the screen assembly method of the present invention.

FIG. 1 illustrates sheets of mesh material 10 that are in substantially a single plane that are aligned with each other and joined to each other preferably by a diffusion bonding technique schematically represented by the arrow 12. A base pipe 14 has holes or openings 16 shown in parallel rows but the invention encompasses all patterns and opening sizes and open area on the base pipe 14. Ultimately a screen assembly 30 will overlay the zone where the openings 16 are located in between ends 20 and 22 of shroud 24. The length of the mesh material 10 is a little shorter than the spacing between the ends 20 and 22. A shroud 24 starts as a flat sheet with openings 28 sized and disposed so that the shroud maintains structural integrity to protect the mesh material 10 when run into the wellbore but in service the openings 28 present a sufficient open area and a large opening size so that they do a negligible amount of filtration and create a minimal pressure drop at the expect flow rates through the assembly. A seam 26 is on the shroud 24 and its orientation can be longitudinal or spiral. It is preferably welded.

Figure 2:
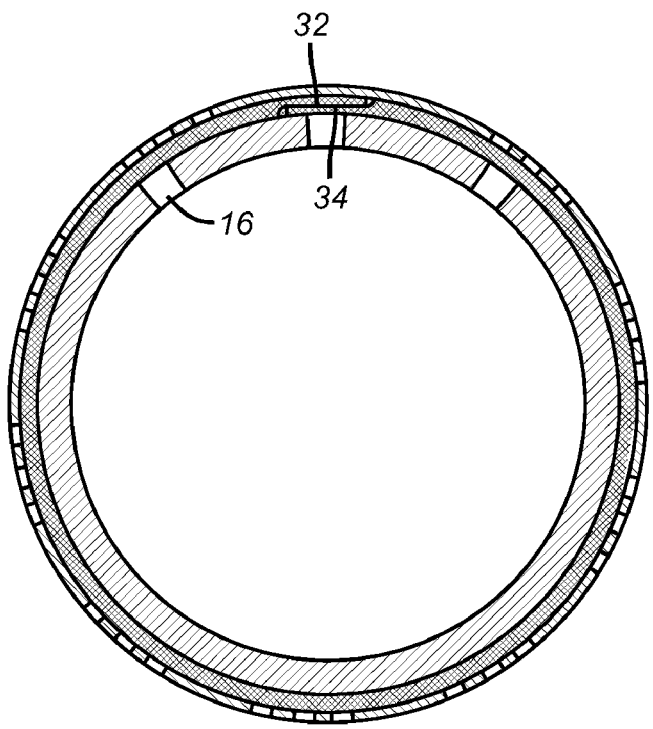
FIG. 2 is a section view along lines 2-2 of FIG. 1.
Figure 3:
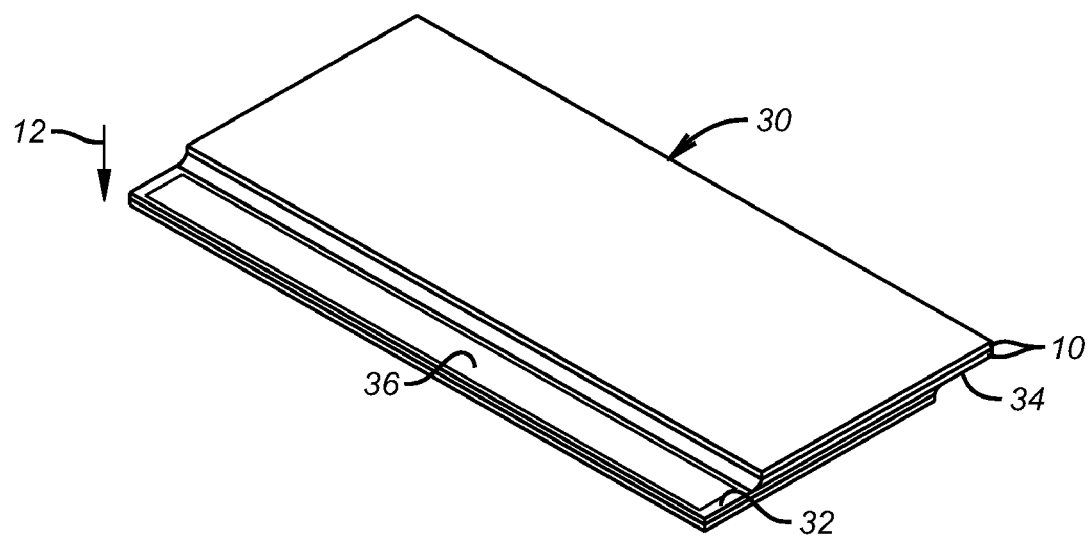
FIG. 3 shows screen material in sheet form with thinner ends after diffusion bonding.

The mesh layers 10 after diffusion bonding together, represented in FIG. 3 by arrow 12, form an assembly 30 that then has opposing edges 32 and 34. These edges 32 and 34 can be mechanically or in other ways compressed so that when the assembly 30 is rolled into a tube shape the edges 32 and 34 overlap, as shown in FIG. 2, so that preferably their aggregate thickness is equal to or slightly greater than the non-overlapping edge portions of the assembly 30. Alternatively the sheets 10 can be stacked before diffusion bonding to create the thinner edges on preferably opposed ends that are overlapped when the tubular shape is created. Although an even thickness all around is preferred, variations where the wall thickness of the assembly 30 at the seam is within about 10% of the thickness elsewhere are acceptable. The number of sheets 10 in the assembly 30 can vary on the application and 3-6 layers are a range for many applications. The thinned ends 32 and 34 that are to be overlapped can also have a resilient material 36 put on one or both edges. Preferably the material 36 is rubber or another material compatible with well conditions. The material 36 is preferably applied before compression of edges 32 or 34 so that it gets pushed into the open spaces in the mesh of the assembly 30. Alternatively, compression of edges 32 and 34 can occur after they are overlapped into a tubular shape and forced through a die schematically illustrated as 38. Similarly, the material 36 can be applied to one or both edges before using the die 38 for the final assembly.

The preferred order for assembly is to create the assembly 30 in flat sheet form and then compress the edges 32 and 34 or alternatively create the thinner ends from the way the sheets are stacked. The assembly can be rolled to a smaller diameter than the base pipe 14 outside diameter so that after the rolled assembly 30 is forced open to get it over the base pipe 14 it has enough memory to stay in position with the edges 32 and 34 overlapping with material 36, if used, already pushed into the openings at the overlapped ends. Ideally the rolled assembly 30 is at the size of the outside diameter of the base pipe 14 with the ends 32 and 34 aligned and overlapping each other so that there are no or minimal bulges on the outside of the assembly 30. While the assembly 30 is on the base pipe 14 the shroud 24 that is already in tubular shape is slipped over the assembly 30 with there preferably being a clearance fit between them. The base pipe is marked for the position of the shroud 24 before the die 38 is employed to compress the assembly 30 and the shroud 24 to the base pipe 14. The ends 20 and 22 get pushed right onto the base pipe 14. In between, the shroud 24 is pressed against the assembly 30 which in turn is pushed tightly onto the base pipe 14 as illustrated in FIG. 2. Optionally the ends 20 or 22 or both of them can be welded to the base pipe 14.

Those skilled in the art will appreciate that the above described method allows the use of an assembly 30 made of layers 10 that are mesh screens essentially in a flat plane that are much cheaper to manufacture than Dutch Twill weave that is made in high manufacturing cost locations around the world. The basic mesh screen of a type similar to that used in screen doors is made in many lost cost locations in the world. When the layers 10 are preferably diffusion bonded together the result is an assembly 30 that functions comparably as a screen material to Dutch Twill but is much cheaper. The use of multiple layers to make an assembly 30 creates a new issue as to how to close the longitudinal or spiral seam without welding which can fail under certain conditions downhole. While Dutch Twill used a single layer and overlapping edges did not create such a large bulge as to present an assembly problem, the assembly 30 that can be at least twice as thick as prior Dutch Twill designs with thicknesses approaching 0.040 inches needed an edge treatment to solve that problem with the higher thickness and still not use welding which many operators find undesirable. Accordingly, the present invention allows the use of a cheaper but thicker screen assembly and finds a way to seal a seam in it without welding by edge thickness reduction, however accomplished and has the flexibility to add a seam sealing material 36 which seals by one or both of sealing the openings in the mesh or being doubled up as the ends are overlapped.

The above description is illustrative of the preferred embodiment and various alternatives and is not intended to embody the broadest scope of the invention, which is determined from the claims appended below, and properly given their full scope literally and equivalently.

I claim:
1. A method of manufacturing a downhole screen assembly, comprising:
   assembling discrete layers of a screen material to each other and away from a base pipe; mounting the assembled layers to said base pipe;
   joining, without welding, opposed edges of said assembled layers to each other over openings on said base pipe.
2. The method of claim 1, comprising:
   assembling said layers with diffusion bonding.
3. The method of claim 1, comprising:
   securing the ends of said assembled layers to the base pipe without welding.
4. A method of manufacturing a downhole screen assembly, comprising:
   assembling discrete layers of a screen material to each other;
   joining, without welding, opposed edges of said assembled layers to each other over openings on a base pipe;
   reducing the thickness of at least one edge of said assembled layers before forming the assembled layers into a tubular shape.
5. The method of claim 4, comprising:
   reducing the thickness of opposed edges of said assembled layers before forming the assembled layers into a tubular shape.
6. The method of claim 5, comprising:
   making the thickness of the overlapped edges no greater than the thickness elsewhere on the assembled layers.
7. A method of manufacturing a downhole screen assembly, comprising:
   assembling discrete layers of a screen material to each other;
   joining, without welding, opposed edges of said assembled layers to each other over openings on a base pipe;
   using mechanical compression to reduce the thickness of at least one edge of said assembled layers before overlapping them.
8. A method of manufacturing a downhole screen assembly, comprising:
   assembling discrete layers of a screen material to each other;
   joining, without welding, opposed edges of said assembled layers to each other over openings on a base pipe;
   adding a sealing material to at least one edge of said assembled layers before compressing said edge to reduce its thickness.
9. The method of claim 8, comprising:
   forcing the sealing material into openings at an edge of the assembled layers.
10. A method of manufacturing a downhole screen assembly, comprising:
    assembling discrete layers of a screen material to each other;
    joining, without welding, opposed edges of said assembled layers to each other over openings on a base pipe;
    putting a shroud over said assembled layers when said assembled layers are on the base pipe;
    forcing the base pipe with the assembled layers and the shroud through a die to join the shroud and assembled layers to the base pipe.
11. A method of manufacturing a downhole screen assembly, comprising:
    assembling discrete layers of a screen material to each other;
    joining, without welding, opposed edges of said assembled layers to each other over openings on a base pipe;

rolling the assembled layers to a smaller diameter than the outside diameter of the base pipe;

opening the rolled assembly to get said rolled assembly onto the base pipe;

relying on memory of the rolled assembled layers to keep the rolled assembly in position on the base pipe with overlapped ends.

12. The method of claim 11, comprising:

sliding a tubular shroud over the assembled base pipe and rolled assembled layers;

advancing the base pipe with the rolled assembled layers and the shroud through a die to join the shroud to the base pipe and to seal the seam in the assembled layers under the shroud.

13. The method of claim 12, comprising:

reducing the thickness of at least one edge of said assembled layers before rolling the assembled layers or as a result of said advancing through a die.

14. The method of claim 13, comprising:

reducing the thickness of opposed edges of said assembled layers before rolling the assembled layers into a tubular shape.

15. The method of claim 14, comprising:

using mechanical compression to reduce the thickness of at least one edge of said assembled layers before overlapping them.

16. The method of claim 15, comprising:

making the thickness of the overlapped edges no greater than the thickness elsewhere on the assembled layers.

17. The method of claim 16, comprising:

adding a sealing material to at least one edge of said assembled layers before compressing said edge to reduce its thickness.

18. The method of claim 17, comprising:

forcing the sealing material into openings at an edge of the assembled layers.

19. The method of claim 18, comprising:

securing the ends of said assembled layers to the base pipe without welding.

20. The method of claim 19, comprising:

forcing the shroud onto the base pipe at the ends of the shroud to secure the ends of the assembled layers to the base pipe.

21. The method of claim 20, comprising:

welding the shroud to the base pipe on both ends.

\* \* \* \* \*